US010829843B2

(12) United States Patent
Imasato et al.

(10) Patent No.: US 10,829,843 B2
(45) Date of Patent: Nov. 10, 2020

(54) METHOD FOR PRODUCING ALUMINUM WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Fumitoshi Imasato, Yokkaichi (JP); Yasuyuki Otsuka, Yokkaichi (JP); Kinji Taguchi, Yokkaichi (JP); Hiroyuki Kobayashi, Yokkaichi (JP); Tetsuya Kuwahara, Osaka (JP); Misato Kusakari, Osaka (JP); Kensuke Yamada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 314 days.

(21) Appl. No.: 15/500,830

(22) PCT Filed: Jun. 4, 2015

(86) PCT No.: PCT/JP2015/066226
§ 371 (c)(1),
(2) Date: Jan. 31, 2017

(87) PCT Pub. No.: WO2016/027550
PCT Pub. Date: Feb. 25, 2016

(65) Prior Publication Data
US 2017/0226615 A1   Aug. 10, 2017

(30) Foreign Application Priority Data

Aug. 19, 2014 (JP) ................. 2014-166867

(51) Int. Cl.
| | | |
|---|---|---|
| *C22F 1/047* | (2006.01) | |
| *C22F 1/04* | (2006.01) | |
| *H01B 1/02* | (2006.01) | |
| *B21C 1/00* | (2006.01) | |
| *B21C 1/16* | (2006.01) | |
| *C21D 1/40* | (2006.01) | |
| *C21D 1/42* | (2006.01) | |
| *C22C 21/08* | (2006.01) | |

(52) U.S. Cl.
CPC .............. *C22F 1/047* (2013.01); *B21C 1/003* (2013.01); *B21C 1/16* (2013.01); *C21D 1/40* (2013.01); *C21D 1/42* (2013.01); *C22C 21/08* (2013.01); *C22F 1/04* (2013.01); *H01B 1/023* (2013.01)

(58) Field of Classification Search
None
See application file for complete search history.

(56) References Cited

U.S. PATENT DOCUMENTS

| | | | | |
|---|---|---|---|---|
| 4,042,424 A | * | 8/1977 | Nicoud | C22C 21/08 148/690 |
| 5,700,424 A | * | 12/1997 | Matsuo | C21D 9/56 148/601 |
| 2011/0036614 A1 | | 2/2011 | Otsuka et al. | |
| 2011/0132659 A1 | | 6/2011 | Kusakari et al. | |
| 2012/0217060 A1 | | 8/2012 | Kusakari et al. | |
| 2012/0241193 A1 | | 9/2012 | Shinoda | |
| 2013/0255840 A1 | | 10/2013 | Otsuka et al. | |
| 2013/0264115 A1 | | 10/2013 | Kobayashi et al. | |
| 2015/0007910 A1 | | 1/2015 | Sekiya et al. | |
| 2015/0213913 A1 | * | 7/2015 | Yoshida | C22C 21/02 174/74 R |
| 2015/0213914 A1 | * | 7/2015 | Mitose | C22F 1/05 |
| 2015/0279499 A1 | * | 10/2015 | Sekiya | C22C 21/02 174/72 A |
| 2015/0325325 A1 | | 11/2015 | Goto | |

FOREIGN PATENT DOCUMENTS

| | | |
|---|---|---|
| CN | 102041418 A | 5/2011 |
| CN | 102119232 A | 7/2011 |

(Continued)

OTHER PUBLICATIONS

Patricia Mariane Kavalco, "Quenching Fundamentals; Quenching of Aluminum Alloys: Cooling Rate, Strength, and Intergranular Corrosion" Heat Treating Progress, vol. 9, No. 7, Nov./Dec. 2009 (ASM International). (Year: 2009).*
C.D. Marioara, "Atomic model for GP-zones in a 6082 Al—Mg—Si system", Acta Materialia, vol. 49, Issue 2, 2001, pp. 321-328, https://doi.org/10.1016/S1359-6454(00)00302-5. (Year: 2001).*

(Continued)

*Primary Examiner* — Alexandra M Moore
*Assistant Examiner* — Catherine P Smith
(74) *Attorney, Agent, or Firm* — Oliff PLC

(57) ABSTRACT

A method for producing an aluminum wire that has high strength and high conductivity even when reduced in diameter while having excellent elongation and improved in productivity. A method for producing an aluminum wire includes a solution step of subjecting a heat-treatable aluminum alloy material to a solution treatment, a wire-drawing step of subjecting the solution-treated aluminum alloy material to wire-drawing processing, a softening step of subjecting the wire-drawing processed aluminum alloy material to a softening treatment in a short time within 10 seconds, and an aging step of subjecting the softening-treated aluminum alloy material to an aging treatment.

16 Claims, No Drawings

(56) References Cited

FOREIGN PATENT DOCUMENTS

| | | |
|---|---|---|
| JP | 2010-043303 A | 2/2010 |
| JP | 2012-132073 A | 7/2012 |
| JP | 2012-241254 A | 12/2012 |
| JP | 2013-076168 A | 4/2013 |
| JP | 2014-074229 A | 4/2014 |
| WO | 2011/052644 A1 | 5/2011 |
| WO | 2011/071097 A1 | 6/2011 |
| WO | 2013/147270 A1 | 10/2013 |
| WO | 2014/112636 A1 | 7/2014 |

OTHER PUBLICATIONS

ASM Handbook, vol. 4: Heat Treating ASM Handbook Committee, p. 841-879 DOI: 10.1361/asmhba0001205 (Year: 1991).*
Feb. 9, 2018 Office Action issued in Korean Patent Application No. 10-2017-7003278.
Nov. 17, 2017 Office Action cited in Chinese Patent Application No. 201580042519.9.
Sep. 7, 2018 Office Action issued in Chinese Patent Application No. 201580042519.9.
Sep. 1, 2015 International Search Report issued in International Patent Application No. PCT/JP2015/066226.
Jun. 17, 2020 Office Action issued in German Application No. DE 11 2015 003 811.6.

* cited by examiner

METHOD FOR PRODUCING ALUMINUM WIRE

TECHNICAL FIELD

The present invention relates to a method for producing aluminum wires suitable as automotive wires.

BACKGROUND ART

Non-heat-treatable alloys such as pure copper, a low concentration copper alloy, and a low concentration aluminum alloy that are excellent in electrical conductivity are used for conductors of automotive wires. Demands for weight reduction of automotive wires require using an aluminum-based material that can achieve a reduced diameter and has a low specific gravity (see Patent Document 1).

CITATION LIST

Patent Literature

Patent Document 1: Patent JP2014-74229
Patent Document 2: Patent JP2013-76168

SUMMARY OF INVENTION

Problems to be Solved by the Invention

Non-heat-treatable aluminum alloys are heated in the final step of a conductor producing process, whereby processing strain is removed from the alloys (softening). Thus, the materials need to be highly strengthened, which requires the concentration of the additive elements to be increased. However, increasing the concentration of the additive elements in the non-heat-treatable aluminum alloys remarkably reduces the conductivity.

Meanwhile, there are also known conductors consisting of heat-treatable aluminum alloys (see Patent Document 2). A solution treatment and an aging treatment are generally used for a general tempering method for the heat-treatable aluminum alloys, whereby the alloys can be improved in strength. A general structural material where strength is important is tempered in the above-described general tempering methods. Also in Patent Document 2, tempering is conducted in the above-described general tempering methods. However, while having high strength by being subjected to the solution treatment and the aging treatment, the wire materials obtained in the above-described general tempering methods do not have sufficient elongation required of electric wire conductors. It is to be noted that the conductors described in Patent Document 2 are intended to improve the elongation by the additive elements to the heat-treatable aluminum alloys, and not intended to improve the elongation by tempering methods. In addition, because the heat-treatable aluminum alloys are subjected to a solution treatment after wire-drawing processing, elemental wires made from the alloys are likely to fuse with each other, and thus improvement is required in terms of productivity.

An object of the present invention is to provide a method for producing an aluminum wire that has high strength and high conductivity even when reduced in diameter while having excellent elongation and improved in productivity.

Means of Solving the Problems

To achieve the objects and in accordance with the purpose of the present invention, a method for producing an aluminum wire according to one embodiment of the present invention includes a solution step of subjecting a heat-treatable aluminum alloy material to a solution treatment, a wire-drawing step of subjecting the solution-treated aluminum alloy material to wire-drawing processing, a softening step of subjecting the wire-drawing processed aluminum alloy material to a softening treatment in a short time within 10 seconds, and an aging step of subjecting the softening-treated aluminum alloy material to an aging treatment.

It is preferable that a temperature of the softening treatment should be 300 degrees C. or higher. It is preferable that a rapid cooling process should be used as a cooling process after a heating process in the softening treatment, and a time in which the temperature of the softening treatment is lowered to 100 degrees C. or lower should be within 10 seconds. It is preferable that a temperature of the aging treatment should be in a range of 0 to 200 degrees C., and a time of the aging treatment should be in a range of 1 to 100 hours. It is preferable that a rapid cooling process should be used as a cooling process after a heating process in the solution treatment, and a time in which the temperature of the solution treatment is lowered to 100 degrees C. or lower should be within 10 seconds. It is preferable that one of electrical heating and induction heating should be used as heating in the softening treatment.

It is preferable that the method should further include, before the aging treatment, a reheat treatment step of subjecting the softening-treated aluminum alloy material to a heat treatment in a short time within 10 seconds at a lower temperature than the softening temperature. It is preferable that a temperature of the heat treatment in the reheat treatment step should be in a range of 100 to 200 degrees C. It is preferable that a slow cooling process should be used as a cooling process after a heating process in the reheat treatment step.

Advantageous Effects of Invention

With the method for producing an aluminum wire according to one embodiment of the present invention, an aluminum wire that has high strength and high conductivity even when reduced in diameter while having excellent elongation and improved in productivity can be obtained. A heat-treatable aluminum alloy material can exhibit excellent strength by strengthening by the precipitation of a metal compound, so that the aluminum alloy material can have improved strength while having its conductivity prevented from being reduced because of additive elements. That is, both strength and conductivity can be achieved. In addition, since the softening treatment is performed on the aluminum alloy material, excellent elongation can be secured. Since the softening treatment is performed in a short time within 10 seconds, precipitation of a coarse metal compound is suppressed in the softening treatment, and the aluminum alloy material can have its strength prevented from being reduced. To be specific, the aluminum alloy material can have its strength prevented from being reduced while strain caused in the wire-drawing processing is removed. In addition, since the wire-drawing processing is performed after the solution treatment, elemental wires made from the aluminum alloy material are not likely to fuse with each other, and the elemental wires are improved in productivity. Since the wire-drawing processing is performed after the solution treatment, the softening treatment that defines a heat treatment for removing processing strain is performed after the wire-drawing processing, the heat treatment being separate from the solution treatment.

In the method, when the temperature of the aging treatment is in the range of 0 to 200 degrees C., and the time of the aging treatment is in the range of 1 to 100 hours, precipitates can be finely dispersed, and the balance between strength and conductivity is achieved. In addition, when electrical heating or induction heating is used as heating in the softening treatment, the aluminum alloy material is rapidly heated and rapidly cooled with ease, so that the softening treatment is easily performed in a short time within 10 seconds. When induction heating is used as heating in the softening treatment, the aluminum alloy material can be prevented from being scratched because the induction heating is a non-contact type heating.

When the method further includes, before the aging treatment, the reheat treatment step of subjecting the softening-treated aluminum alloy material to the heat treatment in a short time within 10 seconds at a lower temperature than the softening temperature, precipitates can be finely precipitated before the aging treatment. Finely precipitating precipitates before the aging treatment allows the fine precipitates to be uniformly dispersed throughout the entire material. In the aging treatment step, the fine precipitates form nuclei to grow precipitates, so that the precipitates uniformly dispersed throughout the entire material are produced. As a result, elongation can be further improved.

DESCRIPTION OF EMBODIMENTS

Hereinafter, detailed descriptions of one embodiment of the present invention will be provided.

A method for producing an aluminum wire according to one embodiment of the present invention is performed using a heat-treatable aluminum alloy material, and includes a solution step, a wire-drawing step, a softening step, and an aging step.

Strength of the heat-treatable aluminum alloy is improved by precipitates that are precipitated by a heat treatment. Examples of the heat-treatable aluminum alloy include 2000 series aluminum alloys, 6000 series aluminum alloys, and 7000 series aluminum alloys of JIS standard such as an Al—Cu—Mg based alloy, an Al—Mg based alloy, and an Al—Zn—Mg based alloy.

The aluminum alloy material can be obtained by casting and rolling a molten alloy having predetermined composition. A coarse metal compound is precipitated among crystals of the heat-treatable aluminum alloy after casting, so that fracture originating from the coarse grains is likely to occur, and thus the aluminum alloy material is low in strength.

In the solution step, the heat-treatable aluminum alloy material obtained by the casting and rolling is subjected to a solution treatment. In the solution treatment, the heat-treatable aluminum alloy material is heated to a solubility limit temperature or higher to sufficiently dissolve the alloy components (dissolved elements, precipitation strengthening elements), and then is cooled to be brought into a supersaturated dissolved state. The solution treatment is performed at a temperature at which the alloy components can be sufficiently dissolved. The solution treatment is performed preferably at 450 degrees C. or higher. The solution treatment is performed preferably at 600 degrees C. or lower, and more preferably at 550 degrees C. or lower. A retention time is preferably 30 minutes or longer so that the alloy components can be sufficiently dissolved. In addition, the retention time is preferably within five hours and more preferably within three hours from the viewpoint of productivity.

A rapid cooling process is preferably used as a cooling process after a heating process in the solution treatment. Rapid cooling can prevent the dissolved elements from being excessively precipitated. As a cooling rate, the time in which the temperature of the solution treatment is lowered to 100 degrees C. or lower is preferably within 10 seconds. The rapid cooling like this can be performed by forced cooling such as immersing the material in a liquid such as water, and blowing air on the material.

The solution treatment may be performed in the air atmosphere or in the non-oxidizing atmosphere. Examples of the non-oxidizing atmosphere include a vacuum atmosphere (reduced pressure atmosphere), an inert gas atmosphere such as a nitrogen atmosphere and an argon atmosphere, a hydrogen-containing gas atmosphere, and a carbon dioxide gas-containing atmosphere. When the solution treatment is performed in the non-oxidizing atmosphere, an oxide layer is not likely to be formed on the surface of the aluminum alloy material.

The solution treatment may be performed in a continuous process or a batch process (discontinuous process). When the solution treatment is performed in the continuous process, a long wire material is easily subjected to the heat treatment under uniform conditions over the entire length, so that variations of characteristics can be reduced. The heating method is not particularly limited, and any one of electrical heating, induction heating, and heating using a heating furnace may be used. When the electrical heating or the induction heating is used as the heating method, rapid heating and rapid cooling are easily performed, so that the solution treatment can be easily performed in a short period of time. When the induction heating is used as the heating method, the aluminum alloy material can be prevented from being scratched because the induction heating is a non-contact type heating.

In the wire-drawing step, the aluminum alloy material is subjected to wire-drawing processing to form an elemental wire for an electric wire from the cast and rolled material. The elemental wire for an electric wire defines a wire material that makes up an electric wire conductor, and makes up a single wire or a stranded wire. The wire-drawing processing is performed on the aluminum alloy material subjected to the solution treatment. Thus, the wire-drawing step is performed after the solution step. A desired number of resulting drawn wires are stranded to form a stranded wire. The resulting drawn wire as a single wire or the resulting drawn wires stranded into a stranded wire are normally wound around a drum to be subjected to a following treatment. If the wire-drawing step is performed before the solution step, the elemental wires fuse with each other in the solution step, and the elemental wires are not improved in productivity.

In the softening step, the aluminum alloy material is subjected to a softening treatment. The softening treatment is performed in order to remove processing strain caused in processing such as wire-drawing processing. Thus, the softening step is performed after the wire-drawing step. The softening treatment is performed on the aluminum alloy material subjected to the wire-drawing processing. By subjecting the heat-treatable aluminum alloy material to the softening treatment, the heat-treatable aluminum alloy material can obtain elongation that cannot be obtained in a general tempering method for a heat-treatable aluminum alloy material. As a result thereof, the heat-treatable aluminum alloy material can obtain good characteristics for electric wires such as bendability, processing properties such as processability into a wire harness (increased flexibility), and resistance to an impact load.

The softening treatment is performed at a temperature equal to or higher than the temperature required for softening. Thus, the softening treatment is performed preferably at 250 degrees C. or higher, and more preferably at 300 degrees C. or higher. If the temperature of the softening treatment is lower than 250 degrees C., the aluminum alloy material is not likely to be sufficiently softened. On the other hand, the softening treatment is performed preferably at 600 degrees C. or lower, and more preferably at 550 degrees or lower from the viewpoint of productivity.

The softening treatment is performed in a short time within 10 seconds. The temperature of the softening treatment defines a temperature at which aging precipitation is caused and a temperature at which coarse precipitates are formed, so that when the time of performing the softening treatment on the heat-treatable aluminum alloy material subjected to the solution treatment is increased, the heat-treatable aluminum alloy material is reduced in strength by the aging precipitation. For this reason, the softening treatment needs to be performed in a very short time so that coarse precipitates are not formed (so that aging precipitation is not caused). Considering this, the softening treatment is performed preferably in a short time within 5 seconds.

If the softening treatment is performed in a batch heating method, the heating time is increased, and thus it is difficult to perform the softening treatment in a short time. In such a case, the aging precipitation progresses concurrently with the softening. For this reason, the softening treatment is preferably performed in a continuous heating method. In addition, when the continuous heating method is used, a long wire material is easily subjected to the heat treatment under uniform conditions over the entire length, so that variations of characteristics can be reduced. Examples of the continuous heating method include an electrical heating method, an induction heating method, and a furnace heating method. When the electrical heating method or the induction heating method is used, the heat-treatable aluminum alloy material is rapidly heated and rapidly cooled with ease, so that the softening treatment is easily performed in a short time. When the induction heating method is used, the aluminum alloy material can be prevented from being scratched because the induction heating is a non-contact type heating.

A rapid cooling process is preferably used as a cooling process after a heating process in the softening treatment. Rapid cooling can prevent the dissolved elements from being excessively precipitated. As a cooling rate, the time in which the temperature of the softening treatment is lowered to 100 degrees C. or lower is preferably within 10 seconds. The rapid cooling like this can be performed by forced cooling such as immersing the material in a liquid such as water, and blowing air on the material.

The softening treatment may be performed in the air atmosphere or in the non-oxidizing atmosphere. Examples of the non-oxidizing atmosphere include a vacuum atmosphere (reduced pressure atmosphere), an inert gas atmosphere such as a nitrogen atmosphere and an argon atmosphere, a hydrogen-containing gas atmosphere, and a carbon dioxide gas-containing atmosphere. When the softening treatment is performed in the non-oxidizing atmosphere, an oxide layer is not likely to be formed on the surface of the aluminum alloy material.

In the aging step, the aluminum alloy material is subjected to an aging treatment. The aging treatment is performed in order to precipitate, as a compound, the alloy components (dissolved elements, precipitation strengthening elements) in the aluminum alloy that is subjected to the solution treatment by heating the alloy components. The aging treatment is performed on the aluminum alloy material subjected to the softening treatment. Thus, the aging step is performed after the softening step.

The aging treatment is performed at a temperature at which the compound can be precipitated or higher; however, the aging treatment is for precipitation strengthening, and is performed under conditions that the aluminum alloy material is not softened. Thus, the temperature of the aging treatment is preferably in the range of 0 to 200 degrees C. If the temperature of the aging treatment is higher than 200 degrees C., the aluminum alloy material is likely to be softened.

It is better to perform the aging treatment at low temperatures for a long period of time because the precipitates can be finely dispersed, and the aluminum alloy material can easily have improved strength. If the aging treatment is performed at high temperatures, coarse precipitates are precipitated non-uniformly, and the aluminum alloy material has reduced strength. Thus, the aging treatment is preferably performed at a temperature in the range of 0 to 200 degrees C. for a period in the range of 1 to 100 hours, whereby the precipitates can be finely dispersed, and the balance between strength and conductivity is achieved. In addition, the aging treatment is more preferably performed at a temperature in the range of 100 to 200 degrees C. and for a period in the range of 1 to 24 hours from the viewpoint of productivity.

The aging treatment may be performed in the air atmosphere or in the non-oxidizing atmosphere. When the aging treatment is performed in the non-oxidizing atmosphere, an oxide layer is not likely to be formed on the surface of the aluminum alloy material. The aging treatment may be performed in a continuous process or a batch process (discontinuous process). When the aging treatment is performed in the continuous process, a long wire material is easily subjected to the heat treatment under uniform conditions over the entire length, so that variations of characteristics can be reduced. The heating method is not particularly limited, and any one of electrical heating, induction heating, and heating using a heating furnace may be used. When the induction heating is used as the heating method, the aluminum alloy material can be prevented from being scratched because the induction heating is a non-contact type heating.

With the above-described method for producing an aluminum wire according to the present embodiment of the present invention, the aluminum wire that has high strength and high conductivity even when reduced in diameter while having excellent elongation and improved in productivity can be obtained. The heat-treatable aluminum alloy material can exhibit excellent strength by precipitation strengthening of a metal compound, so that the aluminum alloy material can have improved strength while having its conductivity prevented from being reduced because of additive elements. That is, both strength and conductivity can be achieved. In addition, since the softening treatment is performed on the aluminum alloy material, excellent elongation can be secured. Since the softening treatment is performed in a short time within 10 seconds, precipitation of a coarse metal compound is suppressed in the softening treatment, and the aluminum alloy material can have its strength prevented from being reduced. To be specific, the aluminum alloy material can have its strength prevented from being reduced while strain caused in the wire-drawing processing is removed. In addition, since the wire-drawing processing is performed after the solution treatment, elemental wires made from the aluminum alloy material are not likely to fuse with each other, and the elemental wires are improved in productivity. Since the wire-drawing processing is performed after the solution treatment, the softening treatment that defines a heat treatment for removing processing strain is performed after the wire-drawing processing, the heat treatment being separate from the solution treatment.

The method for producing an aluminum wire according to the present embodiment of the present invention may further include, after the softening step and before the aging step, a reheat treatment step. In the reheat treatment step, a heat treatment is performed in a short time within 10 seconds at a lower temperature than the softening temperature. By the reheat treatment, precipitates can be finely precipitated before the aging treatment. Finely precipitating precipitates before the aging treatment allows the fine precipitates to be uniformly dispersed throughout the entire material. In the aging treatment step, the fine precipitates form nuclei to grow precipitates, so that the precipitates uniformly dispersed throughout the entire material are produced. As a result, elongation can be further improved.

The temperature of the heat treatment in the reheat treatment step is preferably 100 degrees C. or higher, and more preferably 120 degrees C. or higher, considering that finely precipitating precipitates easily allows the fine precipitates to be uniformly dispersed throughout the entire material, and that cooling water attached to the aluminum alloy material in the softening step can be easily removed. On the other hand, the temperature of the heat treatment in the reheat treatment step is preferably 200 degrees C. or lower, and more preferably 180 degrees C. or lower depending on the type of the aluminum alloy material, considering that the temperature can be easily set as a temperature lower than the softening temperature, and that the gap between the temperature of the heat treatment in the reheat treatment step and the softening temperature can be easily widened.

Electrical heating or induction heating is preferably used as the heat treatment (heating) in the reheat treatment step similarly to the heating in the softening treatment. The aluminum alloy material can be rapidly heated in the electrical heating or the induction heating, so that the heat treatment (heating) is easily performed in a short time within 10 seconds. When the induction heating is used as the heat treatment, the aluminum alloy material can be prevented from being scratched because the induction heating is a non-contact type heating.

The reheat treatment step is preferably performed relatively soon after the softening step considering that finely precipitating precipitates easily allows the fine precipitates to be uniformly dispersed throughout the entire material. If the reheat treatment step is performed long after the softening step, coarse precipitates are likely to be precipitated. If coarse precipitates are precipitated before the reheat treatment step or the aging step, the coarse precipitates form nuclei to be further coarsened, so that fine precipitates are not likely to be uniformly dispersed throughout the entire material. Taking this into consideration, the time from the end of the cooling process in the softening step to the start of the heat treatment in the reheat treatment step is preferably within 12 hours, and more preferably within six hours.

A slow cooling process is preferably used as the cooling process after the heating process in the reheat treatment step from the viewpoint of precipitation control. In the slow cooling process, the aluminum alloy material is not forcibly cooled rapidly with the use of cooling water or the like. Examples of the slow cooling process include a cooling process to leave the aluminum alloy material after the heating process at room temperature to slowly cool the aluminum alloy material naturally, and a cooling process in which the time required for lowering the temperature from the heating temperature to room temperature is set as three hours or longer.

In the above-described method, a wire material having a tensile strength of 200 MPa or more, an elongation of 5% or more, and excellent conductivity is obtained. Thus-obtained wire material makes up a single wire or a stranded wire to make up an electric wire conductor. An insulating coating is formed on the outer periphery of the electric wire conductor, whereby an aluminum wire is obtained. The material for the insulating coating is not particularly limited, and examples thereof include an olefin resin and a vinyl chloride resin. When subjected to the reheat treatment step, the wire material can have an improved elongation of 10% or more while the tensile strength and the conductivity are maintained.

EXAMPLES

A description of the present embodiment of the present invention will be provided with reference to Examples.

Example 1

Aluminum alloy elemental wires were made from a heat-treatable aluminum alloy through the production steps described in Table 1, the heat-treatable aluminum alloy containing 0.6% by mass of Mg, 0.5% by mass of Si, and the balance Al with unavoidable impurities. The elemental wires were evaluated in terms of strength, elongation, conductivity, and productivity.

Solution (treatment): heating at 530 degrees C. for one hour, and rapid cooling (within 10 seconds to 100 degrees C. or lower).
Wire drawing (processing): diameter of 9.5 mm→diameter of 0.3 mm.
Continuous softening (treatment): heating at 500 degrees C. for one second, and rapid cooling (within 10 seconds to 100 degrees C. or lower).
Batch softening (treatment): heating at 350 degrees C. for three hours, and slow cooling (three hours to 100 degrees C. or lower).
Reheat (treatment): heating at 100 degrees C. for one second, and slow cooling (three hours to 30 degrees C. or lower).
Aging (treatment): heating at 150 degrees C. for 10 hours.

The strength (MPa, tensile strength) and elongation (%, breaking elongation) were measured in accordance with the JIS Z2241 (a method of a tensile test for metallic materials, 1998) with the use of a common tensile strength tester. The conductivity (% IACS) was measured in a bridge method. The elemental wires having a strength of 200 MPa or more were evaluated as "good", and the elemental wires having a strength of less than 200 MPa were evaluated as "poor". The elemental wire having an elongation of 10% or more was evaluated as "very good", the elemental wires having an elongation of 5% or more were evaluated as "good", and the elemental wire having an elongation of less than 5% was evaluated as "poor". The elemental wires having a conductivity of 48% IACS or more were evaluated as "good", and the elemental wire having a conductivity of less than 48% IACS was evaluated as "poor". As for productivity, the elemental wires 10,000 m long or more in which no fusion between the elemental wires was found when wound around a drum 400 mm in diameter were evaluated as "good", and the elemental wires in which fusion was found were evaluated as "poor".

Continuous softening (treatment): heating at 500 degrees C. for one second, and rapid cooling (within 10 seconds to 100 degrees C. or lower).

TABLE 1

| | | Production steps | | | | Strength | elongation | Conductivity | Productivity |
|---|---|---|---|---|---|---|---|---|---|
| No. 1 | Solution | Wire drawing | Continuous softening | — | Aging | Good | Good | Good | Good |
| No. 2 | Solution | Wire drawing | — | — | Aging | Good | Poor | Good | Good |
| No. 3 | Solution | Wire drawing | Batch softening | — | Aging | Poor | Good | Good | Good |
| No. 4 | Solution | Wire drawing | Continuous softening | — | — | Poor | Good | Poor | Good |
| No. 5 | Wire drawing | Solution | — | — | Aging | Good | Good | Good | Poor |
| No. 11 | Solution | Wire drawing | Continuous softening | Reheat | Aging | Good | Very good | Good | Good |

Table 1 shows that the aluminum wires obtained in Experiments Nos. 1 and 11 according to the present embodiment of the present invention had strength, elongation, conductivity, and productivity that satisfied the respective conditions, and had high strength and high conductivity even when reduced in diameter while having excellent elongation and improved in productivity. Meanwhile, the aluminum wire obtained in Experiment No. 2 did not have elongation that satisfied its condition because no softening treatment after the wire drawing was included in the method. The aluminum wire obtained in Experiment No. 3 did not have strength that satisfied its condition because more coarse precipitates were formed by the aging precipitation in the softening treatment because of the long softening treatment time. The aluminum wire obtained in Experiment No. 4 did not have strength and conductivity that satisfied the respective conditions because no aging treatment was included in the method. The aluminum wires obtained in Experiment No. 5 fused with each other, and consequently did not have productivity that satisfied its condition because the solution treatment was performed after the wire drawing. The aluminum wire obtained in Experiment No. 11 kept its strength and conductivity while having its elongation improved compared with the aluminum wire obtained in Experiment No. 1 because the reheat step after the softening and before the aging step was included in the method.

Example 2

Aluminum alloy elemental wires were made from a heat-treatable aluminum alloy through the production steps described in Table 2, the heat-treatable aluminum alloy containing 4.5% by mass of Cu, 1.5% by mass of Mg, 0.6% by mass of Mn, and the balance Al with unavoidable impurities. The elemental wires were evaluated in terms of strength, elongation, conductivity, and productivity.

Solution (treatment): heating at 500 degrees C. for one hour, and rapid cooling (within 10 seconds to 100 degrees C. or lower).

Wire drawing (processing): diameter of 9.5 mm→diameter of 0.3 mm.

Batch softening (treatment): heating at 350 degrees C. for three hours, and slow cooling (three hours to 100 degrees C. or lower).

Aging (treatment): heating at 30 degrees C. for 100 hours.

The strength (MPa, tensile strength) and elongation (%, breaking elongation) were measured in accordance with the JIS Z2241 (a method of a tensile test for metallic materials, 1998) with the use of a common tensile strength tester. The conductivity (% IACS) was measured in a bridge method. The elemental wires having a strength of 450 MPa or more were evaluated as "good", and the elemental wires having a strength of less than 450 MPa were evaluated as "poor". The elemental wires having an elongation of 5% or more were evaluated as "good", and the elemental wire having an elongation of less than 5% was evaluated as "poor". The elemental wires having a conductivity of 20% IACS or more were evaluated as "good", and the elemental wire having a conductivity of less than 20% IACS was evaluated as "poor". As for productivity, the elemental wires 10,000 m long or more in which no fusion between the elemental wires was found when wound around a drum 400 mm in diameter were evaluated as "good", and the elemental wires in which fusion was found were evaluated as "poor".

TABLE 2

| | | Production steps | | | | Strength | elongation | Conductivity | Productivity |
|---|---|---|---|---|---|---|---|---|---|
| No. 6 | Solution | Wire drawing | Continuous softening | Aging | | Good | Good | Good | Good |
| No. 7 | Solution | Wire drawing | — | Aging | | Good | Poor | Good | Good |
| No. 8 | Solution | Wire drawing | Batch softening | Aging | | Poor | Good | Good | Good |
| No. 9 | Solution | Wire drawing | Continuous softening | — | | Poor | Good | Poor | Good |
| No. 10 | Wire drawing | Solution | — | Aging | | Good | Good | Good | Poor |

Table 2 shows that results similar to the results shown in Table 1 were obtained while the alloys in Table 2 are different in type from the alloys in Table 1. Table 2 shows that the aluminum wire obtained in Experiment No. 6 according to the present embodiment of the present invention had strength, elongation, conductivity, and productivity that satisfied the respective conditions, and had high strength and high conductivity even when reduced in diameter while having excellent elongation and improved in productivity.

While the embodiment of the present invention has been described in detail, the present invention is not limited to the above-described embodiment, and various modifications can be made without departing from the gist of the present invention.

The invention claimed is:

1. A method for producing an aluminum wire, the method comprising, in order:
   a solution step of subjecting a heat-treatable aluminum alloy material to a solution treatment;

a wire-drawing step of subjecting the solution-treated aluminum alloy material to wire-drawing processing;

a softening step of subjecting the wire-drawing processed aluminum alloy material to a softening treatment, which softening treatment is entirely completed within 10 seconds;

a reheat treatment step of subjecting the softening-treated aluminum alloy material to a heat treatment, which heat treatment is entirely completed within 10 seconds at a lower temperature than the softening temperature; and an aging step of subjecting the softening-treated aluminum alloy material to an aging treatment, wherein no wire-drawing step is performed prior to the solution step, a temperature of the aging treatment is in a range of 0 to 200 degrees C., and a time of the aging treatment is in a range of 1 to 100 hours, and a cooling process after a heating process in the reheat treatment step is carried out to lower the temperature from the heating temperature to room temperature in a period of 3 hours or longer.

2. The method according to claim 1, wherein a temperature of the softening treatment is 300 degrees C. or higher.

3. The method according to claim 2, wherein a rapid cooling process is used as a cooling process after a heating process in the softening treatment, and a time in which the temperature of the softening treatment is lowered to 100 degrees C. or lower is within 10 seconds.

4. The method according to claim 1, wherein a rapid cooling process is used as a cooling process after a heating process in the solution treatment, and a time in which the temperature of the solution treatment is lowered to 100 degrees C. or lower is within 10 seconds.

5. The method according to claim 4, wherein one of electrical heating and induction heating is used as heating in the softening treatment.

6. The method according to claim 5, wherein a temperature of the heat treatment in the reheat treatment step is in a range of 100 to 200 degrees C.

7. The method according to claim 1, wherein a rapid cooling process is used as a cooling process after a heating process in the softening treatment, and a time in which the temperature of the softening treatment is lowered to 100 degrees C. or lower is within 10 seconds.

8. The method according to claim 1, wherein a rapid cooling process is used as a cooling process after a heating process in the solution treatment, and a time in which the temperature of the solution treatment is lowered to 100 degrees C. or lower is within 10 seconds.

9. The method according to claim 1, wherein one of electrical heating and induction heating is used as heating in the softening treatment.

10. The method according to claim 1, wherein a temperature of the heat treatment in the reheat treatment step is in a range of 100 to 200 degrees C.

11. The method according to claim 1, wherein the heat-treatable aluminum alloy material has been obtained by casting and rolling prior to subjecting the material to the solution treatment.

12. The method according to claim 1, wherein the solution treatment is performed at a temperature of 450 degrees C. or higher and 600 degrees C. or lower, for a retention time of 30 minutes or longer.

13. The method according to claim 1, wherein the softening treatment is entirely completed within 5 seconds.

14. The method according to claim 1, wherein a temperature of the aging treatment is in a range of 100 to 200 degrees C., and a time of the aging treatment is in a range of 1 to 24 hours.

15. The method according to claim 1, wherein no wire drawing is performed after the softening treatment.

16. The method according to claim 1, which is performed in the order of the solution step→the wire-drawing step→a stranding step→the softening step→the reheat treatment step→the aging step, with no other step performed between the steps, wherein the stranding step comprises stranding a number of drawn wires into a stranded wire.

* * * * *